United States Patent [19]

Dunks et al.

[11] 4,115,520

[45] Sep. 19, 1978

[54] PROCESS FOR THE SYNTHESIS OF TETRADECAHYDROUNDECABORATE COMPOUNDS

[75] Inventors: Gary Burr Dunks, Peekskill; Kathy Palmer Ordonez, Eastchester, both of N.Y.

[73] Assignee: Union Carbide Corporation, New York, N.Y.

[21] Appl. No.: 837,981

[22] Filed: Sep. 29, 1977

Related U.S. Application Data

[63] Continuation-in-part of Ser. No. 799,005, May 20, 1977, which is a continuation of Ser. No. 668,859, Mar. 22, 1976, abandoned, which is a continuation of Ser. No. 436,663, Jan. 25, 1974, abandoned.

[51] Int. Cl.$^2$ ............................................. C01B 35/18
[52] U.S. Cl. .................................. 423/287; 423/286; 423/294
[58] Field of Search ........................ 423/286, 287, 294

[56] References Cited

U.S. PATENT DOCUMENTS

| 3,328,134 | 6/1967 | Miller et al. ...................... 423/286 X |
| 3,458,531 | 7/1969 | Aftandilian ...................... 423/286 X |
| 3,489,517 | 1/1970 | Shore et al. ........................ 423/294 |

FOREIGN PATENT DOCUMENTS 836,184  6/1960  United Kingdom.

*Primary Examiner*—G. O. Peters
*Attorney, Agent, or Firm*—Richard G. Miller

[57] ABSTRACT

Tetradecahydroundecaborate compounds, $MB_{11}H_{14}$, wherein M represents a monovalent cation are prepared by the reaction of the corresponding octahydroborate compounds, $MB_3H_8$, with boron trifluoride. The reaction is carried out at a temperature of 100° C. to 120° C., preferably in an inert solvent medium.

3 Claims, No Drawings

PROCESS FOR THE SYNTHESIS OF TETRADECAHYDROUNDECABORATE COMPOUNDS

RELATED APPLICATIONS

This application is a continuation-in-part of pending application Ser. No. 799,005, filed May 20, 1977, which is in turn a continuaton of application Ser. No. 668,859, filed Mar. 22, 1976 and now abandoned, which is in turn a continuation of application Ser. No. 436,663, filed Jan. 25, 1974, and now abandoned.

The present invention relates in general to the preparation of tetradecahydroundecaborate compounds, and more particularly to the preparation of these compounds by the reaction of boron trifluoride with an octahydroborate compound.

The $B_{11}H_{14}^-$ anion was first synthesized by V. D. Aftandilian and co-workers by the reaction of ethereal $B_2H_6$ and $NaB_{10}H_{13}$, ("Inorganic Chemistry," Vol. 1, No. 4,734–737 (1962)). $LiB_{11}H_{14}$ was similarly prepared. Both salts were isolated as etherates, $NaB_{11}H_{14}\cdot2.5$ dioxane and $LiB_{11}H_{14}\cdot2$ dioxane. These etherates dissolve readily in water and from metathesis reactions, crystalline nonsolvated cesium, tetramethylammonium, trimethylsulfonium and trimethylammonium salts can be isolated in accordance with the Aftandilian et al. report.

Another synthesis procedure in which a hydride ion source and a boron hydride, e.g. $NaBH_4 + B_2H_6$, are reacted in a solvent medium such as dioxane to form the corresponding $B_{11}H_{14}^-$ salt is reported by H. C. Miller et al. in "Inorganic Chemistry," Vol. 3, No. 10, 1456–1462 (1964). In this reaction the $B_2H_6/NaBH_4$ molar ratio should be kept well below stoichiometric requirements to avoid unduly rapid or violent reactions.

We have now discovered a new method for synthesizing compounds containing the $B_{11}H_{14}^-$ anion which avoids the use of the highly unstable lower boranes, especially diborane ($B_2H_6$), and can be readily accomplished without the use of specialized apparatus.

Essentially the process comprises contacting in an inert solvent medium and at a temperature of from 100° C. to 120° C. an octahydrotriborate having the formula $MB_3H_8$ wherein M represents an ion selected from the class consisting of lithium, sodium, potassium, cesium and alkylonium, with boron trifluoride ($BF_3$). Preferably, the $BF_3$ is added slowly to the octahydrotriborate in the inert solvent in order to avoid a temperature rise of the reaction mixture greater than about 5° C. To obtain maximum yields of the tetradecahydroundecaborate product, substantially equal molar proportions of the said reactants are employed.

The octahydrotriborate reagent can be prepared by any of several methods known in the art. For example, sodium octahydrotriborate is formed by the reaction of tetraborane with tetrahydroborate in ethyl ether according to the equation:

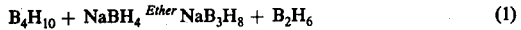

(1)

Pentaborane (9) can be cleaved to the $B_3H_8^-$ ion with tetramethylammonium hydroxide in aqueous dioxane solutions according to the reaction:

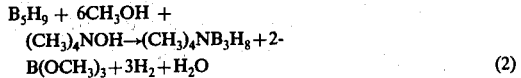

(2)

Using sodium methoxide in methanolic solution, pentaborane (9) is readily cleaved to form sodium octahydrotriborate in good yield.

A preferred method is the reaction of a metal borohydride, $MBH_4$, such as sodium borohydride with boron trifluoride in an inert organic solvent as set forth in co-pending application Ser. No. 799,005 filed May 20, 1977, the disclosure of which is incorporated herein by reference. In accordance with this method a metal borohydride, $MBH_4$, in which M is a metal ion selected from the group consisting of lithium, sodium, potassium, rubidium and cesium is contacted with less than 160 per cent of the stoichiometric quantity of $BF_3$ or a suitable precursor of $BF_3$ at a temperature of 100° C. to 120° C.

The stoichiometric quantities involved for $MB_3H_8$ preparation determined with reference to the following equation:

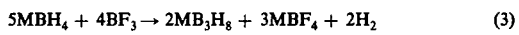

(3)

Beyond the stoichiometric amount of $BF_3$ necessary for the completion of the reaction of equation (3), however, it is found that the concentration of the $B_3H_8^-$ ion is decreased and a simultaneous production of $B_{11}H_{14}^-$ ion occurs. At approximately 160 per cent of the $BF_3$ required by equation (3) the concentration of $B_3H_8^-$ ion is essentially zero and the concentration of $B_{11}H_{14}^-$ ion is greater than 90 per cent yield based on equation (4) below:

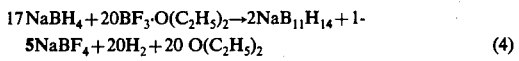

(4)

It is accordingly the preferred method for preparing tetradecahydroundecaborate compounds to prepare $MB_3H_8$ compounds in situ by the reaction of $MBH_4$ compounds and $BF_3$ using greater than stoichiometric amounts of $BF_3$ for that purpose, preferably at least 120 per cent of the stoichiometric requirements.

It will be understood that the $BF_3$ reagent need not be introduced into the reaction system per se but can also be derived from a precursor such as a dialkyletherate, or be generated in situ from appropriate reagents well known in the art. Boron trifluoride dialkyletherates in which the alkyl groups contain from 1 to 4 carbon atoms are well suited for use in the present invention. These lower alkyl groups need not be of the same chain length in a given molecule.

The inert organic solvent medium employed is not critical as to chemical composition, but advantageously has a boiling point above 100° C. in order to avoid the need for superatmospheric pressure in the reaction system. Pressure is not a critical factor, however. In general, ethers boiling above 100° C. under the imposed pressure conditions such as the dimethyl ether of diethylene glycol, diethyl "Cellosolve," diethyl "Carbitol" and dimethoxy-1,3-butane are well suited for use in the process.

The preferred mode of operation of the present process is to add the $BF_3$ reagent to the octahydrotriborate compound in the inert solvent at a rate sufficiently slow to avoid an increase in the reaction temperature of greater than about 5° C. This procedure avoids the harmful effects of localized overheating, i.e. portions of the reaction system exceeding 120° C. with consequent decrease in yield of the $MB_{11}H_{14}$ final product.

The process of the present invention is illustrated by the following examples:

EXAMPLE 1

Synthesis of $B_3H_8^-$ in situ and Conversion Thereof to $B_{11}H_{14}^-$

The 2000 ml, three neck, round bottom flask employed for this experiment was fitted with a Dry-ice trap and an ether trap attached to one of the necks. A mechanical stirrer was also connected through the center neck and the remaining neck was connected to a metering pump which led to a reservoir of boron trifluoride diethyletherate. Means also were provided for temperature measurements in the flask as well as the introduction of nitrogen. Commercial grade sodium borohydride and boron trifluoride diethyletherate (98 per cent) were employed. The flask was charged with 500 ml of diglyme and 60g (1.59 mol) of $NaBH_4$. The ether trap was cooled with Dry ice/2-propanol, the reaction mixture was heated to 105° C. and boron trifluoride diethyletherate (250 ml, 2.04 mol) was added at the rate of approximately 40 ml/hr. When the addition was complete, the viscous, yellow mixture was allowed to cool to room temperature. The contents of the flask were filtered in air using a medium porosity frit. The solids were washed with two, 50 ml portions of dry diglyme. The combined diglyme solutions were stripped using a rotary evaporator and mechanical pump at approximately 57° C. to isolate the $NaB_{11}H_{14}$ product.

EXAMPLE 2

Synthesis of $(CH_3)_4NB_{11}H_{14}$ from $(CH_3)_4NB_3H_8$

Fifty ml of diglyme and a 11.7 gram sample (0.102 mol) of tetramethylammonium octahydrotriborate prepared by the cleavage of pentaborane (9) with tetramethylammonium hydroxide in methanolic solution is charged to a 200 ml, three neck, round bottom flask of a reaction system otherwise the same as that used in Example 1. The reaction flask and contents are heated to 110° C. and 12.5 ml (0.102 mol) of commercial grade boron trifluoride diethyletherate (98 per cent) is added at the rate of 1.5 ml per minute. When the addition is complete, the reaction mass is cooled to ambient room temperature, filtered, and washed with dry diglyme. The $(CH_3)_4NB_{11}H_{14}$ product is recovered by stripping the diglyme medium.

The $B_{11}H_{14}^-$ containing compounds prepared by the present process are radily oxidized to decaborane (14) by contact with chemical oxidants having an electrode potential of at least + 0.6 volts.

EXAMPLE 3

Synthesis of $(C_2H_5)_4NB_{11}H_{14}$ from $(C_2H_5)_4NB_3H_8$

To a 1000 ml, 3-neck flask equipped with mechanical stirring, nitrogen inlet topped addition funnel, a Dry-ice condenser fitted to an ether trap and means for measuring and controlling the temperature, was charged 18.0g (0.105 mol) of $(C_2H_5)_4HB_3H_8$ and 500 ml of diglyme and heated to 105° C. Over a period of 2.37 hours 15.0 ml (0.120 mol) of $BF_3\cdot O(C_2H_5)_2$ was added. The contents of the flask were cooled to room temperature and filtered using a medium porosity frit. The solids (16.6g, 0.077 mol) of $(C_2H_5)_4NBF_4$ were washed with two, 50 ml portions of diglyme. The combined diglyme fractions were stripped at reduced pressure using a rotary evaporator to a yellow oil. The oil was triturated in ethyl ether and filtered. The solids were dissolved in acetone and water was added. The solution was allowed to cool and maintained at 10° C overnight. The crystals were filtered and dried in vacuo. The yield was 3.55g (0.013 mol) of $(C_2H_5)_4NB_{11}H_{14}$. A second crop (0.75 g, 0.003 mol) was obtained from the liquor.

EXAMPLE 4

Synthesis of $(C_2H_5)_4NB_{11}H_{14}$ from $B_3H_8^-$ Ion Prepared in situ.

Into a 2000 ml, 3-neck flask, which was equipped with an additional funnel, a Dry-ice condenser fitted to an ether trap and means to measure and control the temperature, and a mechanical stirrer, was placed 500 ml of diglyme and 60.0g (1.59 mol) of $NaBH_4$. The off-gases were passed through an acetone bubbler to destroy any evolved $B_2H_6$. The contents of the flask were heated to 105 ± 2° C. The trap was filled with Dry-ice and 2-propanol, and $BF_3\cdot O(C_2H_5)_2$ was added at 40 ml/hr (250 ml, 2.04 mol). After the addition was complete (6 hr), the flask and contents were allowed to cool to room temperature. The ether trap contained 121.1g (1.64 mol) of ethyl ether. The contents of the flask were filtered in air using a medium porosity frit. The solids (141.6g, 1.29 mol, $NaBF_4$) were washed twice with 50 ml of dry diglyme. The combined diglyme solution was evaporated to an oil using a rotary evaporator (1 mm. Hg, 67° C). The oil was taken up in 500 ml of water and added in one portion to a solution of 100g (0.475 mol) of $(C_2H_5)_4NBr$ in 200 ml of water. The mixture was allowed to stand 15 min. and filtered. The filter cake was dissolved in 300 ml of acetone (slight degassing) and heated to reflux. Water was added until slight cloudiness appeared and the solution was allowed to cool slowly to room temperature then cooled to 10° C overnight. The pale yellow crystals were filtered and dried in vacuo to yield 25.7g (0.098 mol) of $(C_2H_5)_4NB_{11}H_{14}$. The liquid was evaporated to about one-half the original volume and water added to cloudiness. The solution was cooled as above and the yellow crystals filtered. The crystals were washed with ethyl ether to remove the yellow color to yield 5.1g (0.019 mol) of tan crystals. The pale yellow and tan materials were indistinguishable by $^{11}B$ nmr and ir spectroscopy. The $^{11}B$ nmr spectra were identical to those of authentic $(C_2H_5)_4NB_{11}H_{14}$.

EXAMPLE 5

Synthesis of $(CH_3)_3NHB_{11}H_{14}$ from $B_3H_8^-$ Ion Prepared in situ in Diglyme Solvent To a 2000 ml, 3-necked flask equipped as in Example 1, was placed 500 ml of diglyme and 60.0g (1.59 mol) of $NaBH_4$. The mixture was heated to 105° and 250 ml (2.04 mol) of $BF_3\cdot O(C_2H_5)_2$ was added over 6 hours. The reaction mixture was heated for one additional hour then allowed to cool to room temperature. The contents of the flask were filtered using a medium porosity frit to remove 154g of $NaBF_4$. The filtrate was stripped using a mechanical vacuum pump and a rotary evaporator, to an oil. The oil was dissolved in 200 ml of water and added to a molar excess of $(CH_3)_3NHCl$ in water. The mixture was allowed to stand 15 minutes and filtered. The solid crude product was dissolved in 300 ml of acetone and heated to reflux temperature. Water was added until the solution became cloudy. The mixture was allowed to cool during which time crystals formed. The crystals were filtered and dried in vacuo to yield 0.11 mol of $(CH_3)_3NHB_{11}H_{14}$.

EXAMPLE 6

Synthesis of $B_{11}H_{14}^-$ Ion From $B_3H_8^-$ Ion Prepared in situ in Diethylcarbitol Solvent.

To a 2000 ml, 3-necked flask equipped as in Example 1, was placed 500 ml of diethylcarbitol and 60.0g (1.59 mol) of $NaBH_4$. The mixture was heated to 105° C and 250 ml (2.04 mol) of $BF_3 \cdot O(C_2H_5)_2$ was added over a 6 hour period. When the addition was complete, the contents of the flask were heated for one additional hour and cooled to 30° C. Quantitative analysis of the reaction mixture indicated the presence of 0.12 mol of $B_{11}H_{14}^-$ ion.

What is claimed is:

1. Process for preparing a tetradecahydroundecaborate which comprises contact in an inert solvent medium and at a temperature of from 100° C. to 120° C. $BF_3$ with an octahydrotriborate having the formula $MB_3H_8$ wherein M represents an ion selected from the class consisting of lithium, sodium, potassium, cesium and alkylammonium.

2. Process according to claim 1 wherein the $MB_3H_8$ and $BF_3$ reactants are employed in substantially equal molar proportions and the $BF_3$ reactant is added to the $MB_3H_8$ in the inert solvent medium at a rate sufficiently slow to avoid a temperature rise in the reaction mixture of greater than 5° C.

3. Process according to claim 1 wherein the $MB_3H_8$ reactant is prepared in situ in the solvent medium by the reaction at 100° C. to 120° C. of a metal borohydride having the formula $MBH_4$ wherein M represents an ion selected from the class consisting of lithium, sodium, potassium, cesium and alkylammonium.

* * * * *